United States Patent
Oedegaard (10) Patent No.: US 10,941,627 B2
(45) Date of Patent: Mar. 9, 2021

(54) AXIAL FACE SEAL SYSTEM

(71) Applicant: OneSubsea IP UK Limited, London (GB)

(72) Inventor: Jens R. Oedegaard, Nordstrono (NO)

(73) Assignee: OneSubsea IP UK Limited, London (GB)

( * ) Notice: Subject to any disclaimer, the term of this patent is extended or adjusted under 35 U.S.C. 154(b) by 756 days.

(21) Appl. No.: 15/716,153

(22) Filed: Sep. 26, 2017

(65) Prior Publication Data
US 2019/0093437 A1 Mar. 28, 2019

(51) Int. Cl.
| | | |
|---|---|---|
| *E21B 33/038* | (2006.01) | |
| *E21B 33/076* | (2006.01) | |
| *E21B 17/05* | (2006.01) | |
| *B63B 21/50* | (2006.01) | |
| *F16L 27/08* | (2006.01) | |
| *F16L 39/06* | (2006.01) | |
| *F16J 15/3268* | (2016.01) | |

(52) U.S. Cl.
CPC .......... *E21B 33/038* (2013.01); *B63B 21/507* (2013.01); *E21B 17/05* (2013.01); *E21B 33/0385* (2013.01); *E21B 33/076* (2013.01); *F16L 27/0804* (2013.01); *F16J 15/3268* (2013.01); *F16L 39/06* (2013.01)

(58) Field of Classification Search
CPC .... E21B 33/038; E21B 17/05; E21B 33/0385; E21B 33/076; B63B 21/507; F16L 27/0804; F16L 39/06; F16J 15/3268
USPC ... 285/96, 98, 106, 111, 121.1, 121.3, 121.6
See application file for complete search history.

(56) References Cited

U.S. PATENT DOCUMENTS

| | | | | |
|---|---|---|---|---|
| 2,768,843 A | * | 10/1956 | Zeilman | F16J 15/002 285/124.1 |
| 4,626,003 A | * | 12/1986 | Williams | F16L 27/0828 277/361 |
| 4,662,657 A | * | 5/1987 | Harvey | F16L 39/06 285/96 |
| 5,180,008 A | * | 1/1993 | Aldridge | E21B 33/04 277/322 |

(Continued)

FOREIGN PATENT DOCUMENTS

| | | | | | |
|---|---|---|---|---|---|
| GB | 2306595 A | * | 5/1997 | | F16L 17/10 |
| GB | 2306672 A | * | 5/1997 | | F16L 39/06 |

(Continued)

OTHER PUBLICATIONS

Extended European Search Report issued in European Patent Appl. No. 18196468.5 dated Nov. 22, 2018; 11 pages.

*Primary Examiner* — James M Hewitt, II
(74) *Attorney, Agent, or Firm* — Helene Raybaud (57) ABSTRACT

A technique facilitates enhanced sealing capability in a space saving format when utilizing a plurality of uniquely constructed seals. As a result, the seals are useful in swivels and other types of structures to provide secure sealing between seal surfaces while reducing the overall seal area. Each seal comprises a body having a seal base combined with lips which may be activated when the activation fluid is supplied under pressure. In swivel applications, the seals may be constructed in a vertical orientation as axial face seals. The vertical orientation of the seals enables construction of the swivel with a reduced cross-section and thus a reduced hydraulic loading.

19 Claims, 4 Drawing Sheets

(56) References Cited

U.S. PATENT DOCUMENTS

| | | | | |
|---|---|---|---|---|
| 5,702,130 A * | 12/1997 | Jostein | ............... | F16L 39/06 |
| | | | | 285/96 |
| 5,895,077 A * | 4/1999 | Sigmundstad | ........ | F16L 27/087 |
| | | | | 285/96 |
| 2002/0017785 A1 * | 2/2002 | Omiya | ................ | F16L 27/087 |
| | | | | 285/121.3 |
| 2014/0060853 A1 * | 3/2014 | Henderson | .......... | F16L 27/0804 |
| | | | | 166/374 |
| 2016/0348818 A1 | 12/2016 | Perratone | | |
| 2017/0096193 A1 * | 4/2017 | Eide | ..................... | F16L 17/10 |

FOREIGN PATENT DOCUMENTS

| | | | | |
|---|---|---|---|---|
| WO | 9716667 A1 | 5/1997 | | |
| WO | WO-9716674 A1 * | 5/1997 | ............. | F16L 39/06 |
| WO | 9831963 A1 | 7/1998 | | |
| WO | 0079174 A1 | 12/2000 | | |
| WO | WO-2017068132 A1 * | 4/2017 | ........... | B63B 21/507 |

\* cited by examiner

AXIAL FACE SEAL SYSTEM

BACKGROUND

Hydrocarbon fluids such as oil and natural gas are obtained from a subterranean geologic formation, referred to as a reservoir, by drilling a well that penetrates the hydrocarbon-bearing geologic formation. In subsea applications, the well is drilled at a subsea location and the flow of fluids may be handled by several different types of equipment. For example, the subsea equipment may comprise a subsea installation mounted over a wellhead and ultimately placed in communication with a surface vessel. Because the subsea installation is stationary and the surface vessel is allowed to weathervane/rotate due to wind, wave motion, and sea current changes, operational lines, e.g. production lines, injection lines, and communication lines, may be connected through a swivel. The swivel combines a geostationary portion with a rotational portion, e.g. swivel rings, to accommodate movement of the vessel while maintaining the functionality of the operational lines.

SUMMARY

In general, a system and methodology utilize a plurality of seals which are activated via an activation fluid to provide enhanced sealing capability in a space saving format. As a result, the seals are useful in swivels and other types of structures to provide secure sealing between seal surfaces while reducing the overall seal area otherwise associated with conventional sealing techniques. Each seal comprises a body having a seal base combined with lips which may be activated when the activation fluid is supplied under pressure. In swivel applications, the seals may be constructed in a vertical orientation as axial face seals. The vertical orientation of the seals enables construction of the swivel with a reduced seal area cross-section, thus reducing hydraulic loading on the swivel.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The present disclosure generally relates to a system and methodology utilizing a unique type of face seal activated via an activation fluid. In some embodiments, a plurality of the seals may be used in cooperation and in a manner which provides enhanced sealing capability in a space saving format. Consequently, the seals may be used in swivels and other types of structures to provide secure sealing between seal surfaces while reducing the overall seal area otherwise associated with conventional types of seals.

Each seal comprises a body having a seal base combined with lips which may be activated when the activation fluid is supplied under pressure. Additionally, each seal may include a biasing member, e.g. a spring member, which works in cooperation with the activation fluid to bias the seal to an active, sealing position. In swivel applications, the seals may be constructed for use in a vertical orientation as vertical, activated face seals. The vertical orientation of the seals enables construction of the swivel with a reduced seal area cross-section, thus reducing hydraulic loading.

In swivel applications, the seals may be oriented vertically in a space-saving arrangement to provide a barrier between process fluids, e.g. process hydrocarbons, and the environment. A barrier fluid may be provided on one side of each seal at a higher pressure than the process fluid pressure so that all potential seal leaks result in leakage of clean barrier fluid rather than hydrocarbon-based fluid. Additionally, an activation fluid may be used to bias the seal into a secure, sealing position between the process fluid and the barrier fluid. The narrow, vertical orientation of the seals described herein minimizes the pressurized area of the seal region and thus reduces forces acting on the swivel, e.g. forces acting on a swivel inner core and nut. Depending on the application and arrangement of seals, the vertical activated face seals described herein can reduce the pressurized area and thus the core vertical load/stress by 20-40% or more.

This reduction in pressurized area allows swivels to be constructed with a slimmer form, e.g. reduced external diameter, along with a lower weight and lower cost. The reduction of pressurized area also may enable construction of swivels with increased swivel flow and/or bore capacity. Furthermore, the small format seals enable construction of swivels with an increased pressure rating because the loading acting on components of the swivel is reduced. In some applications, the number of seals may be reduced relative to conventional seal arrangements.

Also, the pressurized seal activating fluid and the barrier fluid are independent from each other and this expands the available seal and barrier fluid configurations. Furthermore, the seals are dynamically and individually activated and can handle a pressure differential in both directions. This allows the barrier fluid pressure to be lower than the process fluid pressure in some types of applications. The pressure activated part of the seal is static to provide a robust seal design, and each seal may be constructed from combinations of different materials selected according to the parameters of a given operation. It should be noted the seal or seals may be used in a variety of applications other than swivel applications to provide secure, space efficient sealing between seal surfaces.

Figure 1:
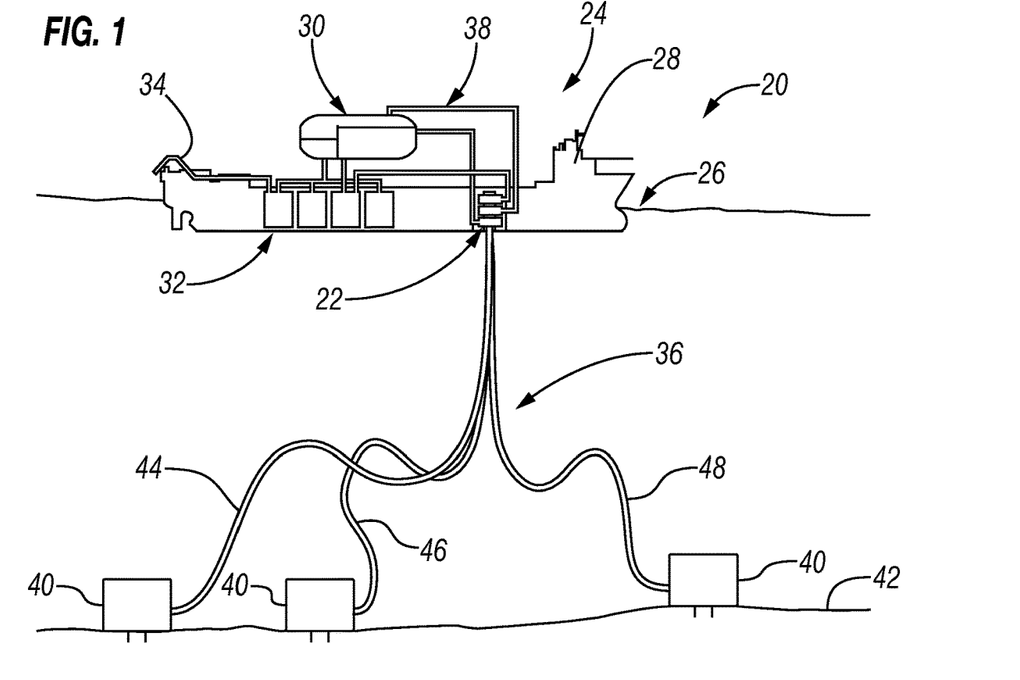
FIG. 1 is a schematic illustration of an example of a subsea well system employing a surface vessel which works in cooperation with a swivel for connecting operational lines which are routed to subsea installations, according to an embodiment of the disclosure.

Referring generally to FIG. 1, an example of a subsea system 20 is illustrated. In this embodiment, a swivel 22 is mounted to a surface facility 24 which is allowed to move at a surface 26 of the sea. For example, the surface facility 24, e.g. surface vessel, is allowed to weathervane/rotate due to wind, wave motion, and sea current changes. The swivel 22 accommodates this rotational movement of the surface facility 24 relative to stationary subsea components or installations as described in greater detail below. The movable surface facility 24 may comprise a variety of vessels, platforms, or other surface facilities employed in well related operations, e.g. hydrocarbon production. By way of example, the surface facility 24 may comprise a surface vessel 28, such as a floating, production, storage and off-loading (FPSO) vessel.

The surface vessel 28 may comprise many types of components, such as processing equipment 30, storage tanks 32, offtake lines 34, and other components or features selected for a given operation. Additionally, the swivel 22 may be mounted at a variety of locations on or relative to the surface facility 24. By way of example, the swivel 22 may be mounted as an external turret, a keel integrated turret, an internal turret, or a subsea swivel.

The swivel 22 may be used for various purposes such as the coupling of subsea operational lines 36 with surface operational lines 38. In some applications, the swivel 22 may be coupled between a geostationary subsea component, such as a riser, and surface lines 38 to accommodate movement of vessel 28 without causing component damage. In the illustrated example, the swivel 22 enables the surface vessel 28 and the surface operational lines 38 to move relative to the subsea operational lines 36 as the surface vessel 28 weathervanes/rotates due to waves, wind, sea current changes, or other factors. By way of example, the subsea operational lines 36 may be routed through a geostationary riser which is coupled with a geostationary portion of the swivel 22.

Additionally, the subsea operational lines 36 may be coupled with various subsea installations 40 located at, for example, a seabed 42 and may be used to carry various process fluids from or to wells associated with the subsea installations 40. The operational lines 36, 38 may comprise, for example, a well fluid line 44, a gas injection line 46, a water injection line 48, and/or additional or other types of process fluid lines.

Figure 2:
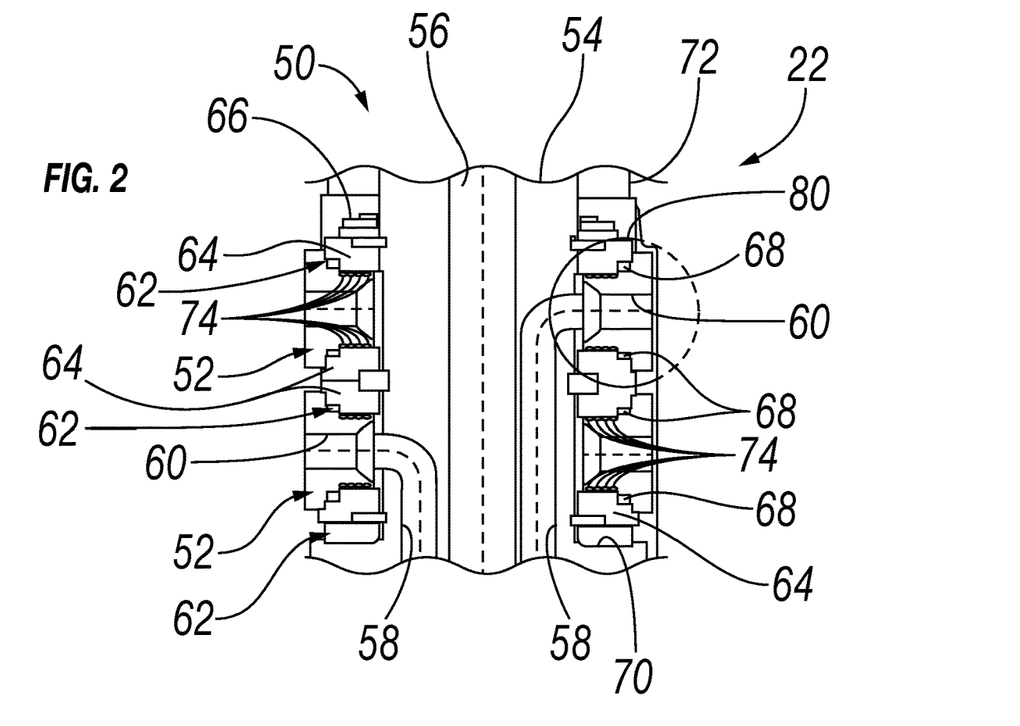
FIG. 2 is a cross-sectional illustration of an example of a swivel incorporating unique space-saving seals positioned between swivel rings rotatably mounted about a swivel base to provide desired sealing capability while enabling construction of the swivel with a reduced diameter and/or higher pressure rating, according to an embodiment of the disclosure.

A portion of an embodiment of swivel 22 is illustrated in cross-section in FIG. 2. In this example, the swivel 22 comprises a swivel base 50 about which at least one swivel ring 52, e.g. a plurality of rings 52, is mounted for rotational movement relative to the swivel base 50. By way of example, the swivel rings 52 may be rotatable through an unlimited angle or, in some embodiments, over a suitable other angle with respect to the swivel base 50 depending on the parameters of a given operation. In some embodiments, the swivel base 50 is in the form of a geostationary portion which remains geostationary while the ring or rings 52 rotate relative to the geostationary base portion 50.

The swivel base 50 may comprise various components and features selected to accommodate specific types of operations. For example, the swivel base 50 may comprise a swivel core 54 having, for example, a longitudinal passageway 56 extending therethrough and a process fluid passage 58, e.g. a plurality of process fluid passages 58. The process fluid passages 58, e.g. bores, extend longitudinally along a portion of the swivel core 54 and then turn radially outward for fluid coupling with corresponding passages of swivel rings 52.

In this example, the subsea operational lines 36 may be coupled into fluid communication with the process fluid passages 58 and the surface operational lines 38 may be coupled with corresponding passages 60 formed radially through rings 52. It should be noted the rotatable rings 52 may be used to accommodate many types of operational lines 36, 38, such as production lines, injection lines, electrical lines, fiber-optic lines, and/or other lines connected between subsea equipment and surface equipment.

The swivel base 50 also may comprise other components, such as bearing ring assemblies 62 positioned on longitudinal sides of each swivel ring 52 to facilitate rotation of the swivel rings 52. The bearing ring assemblies 62 may comprise a variety of features, such as bearing rings 64, compensators 66, and bearings 68, e.g. roller bearings. By way of example, the stack of bearing ring assemblies 62 and swivel rings 52 may be secured along the swivel core 54 by an abutment 70 and a swivel base nut 72.

Figure 3:
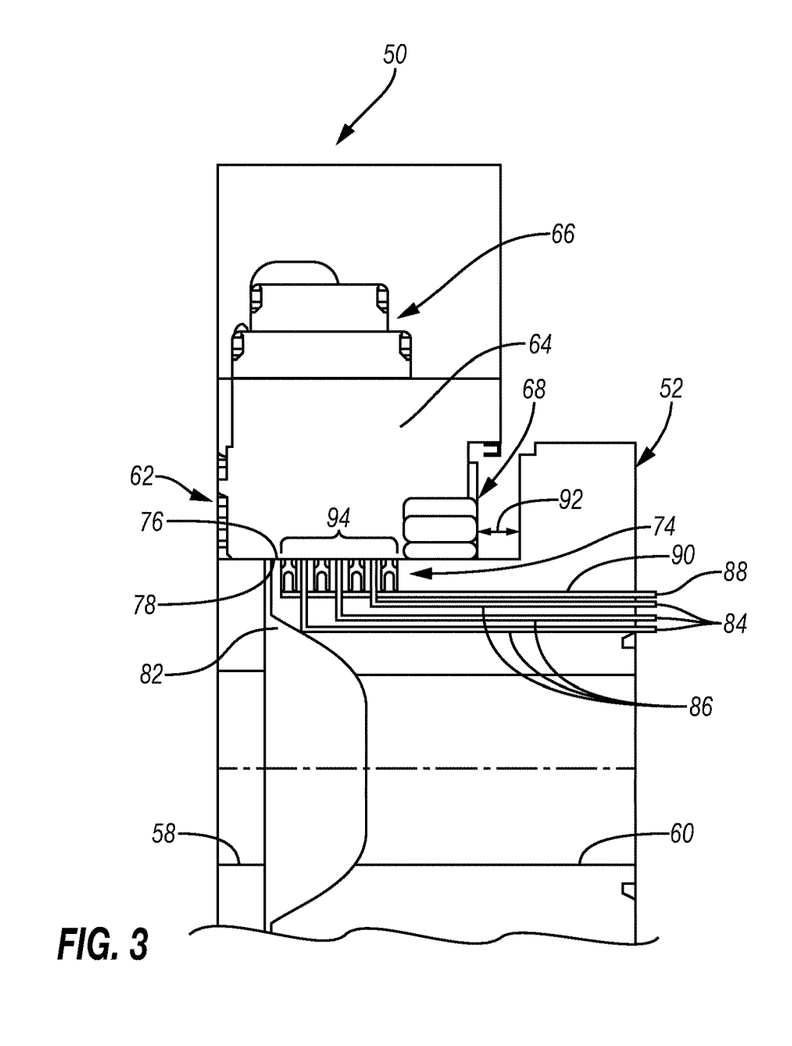
FIG. 3 is a cross-sectional illustration of an enlarged portion of FIG. 2 showing one of the rotatable rings mounted about a swivel base with a plurality of seals disposed between corresponding seal surfaces of the rotatable ring and the swivel base, according to an embodiment of the disclosure.

Additionally, a plurality of seals 74 may be positioned between seal surfaces of each swivel ring 52 and the swivel base 50, e.g. between seal surfaces 76 of each ring 52 and corresponding seal surfaces 78 of swivel base 50. In the illustrated example, the corresponding seal surfaces 78 are located on bearing rings 64 of the bearing ring assemblies 62, as further illustrated in FIGS. 3 and 4. As a given swivel ring 52 rotates relative to the swivel base 50, the seal surfaces 76 (and the seals 74) move relative to corresponding seal surfaces 78. FIG. 3 illustrates an enlarged portion of FIG. 2 (which is generally encircled and labeled with reference 80) to facilitate explanation of an embodiment of seals 74.

In the example illustrated, the seals 74 are employed in a vertically oriented swivel 22 such that swivel core 54 is oriented vertically and swivel rings 52 extend radially outwardly (generally horizontally) from the swivel core 54. Consequently, the seals 74 are each constructed and oriented as axial face seals so as to reduce the radial extent and size of the pressurized seal area, thus enabling construction of a slimmer, lower weight, lower cost swivel 22. When the seals 74 are oriented as axial face seals, the seal surfaces 76 and corresponding seal surfaces 78 are generally parallel to each other and lie along radial planes. For example, swivel rings 52 may be positioned generally horizontally such that the seal surfaces 76 on the top and bottom of each swivel ring 52 are generally parallel to each other and lie along radial planes. It should be noted the reduced pressure area also enables construction of swivel 22 with capability for increased flow therethrough and/or an increased pressure rating.

Referring again to FIG. 3, the vertical, activated face seals 74 each comprise a body having a base and lips extending from the base in a generally vertical direction, as discussed in greater detail with reference to FIGS. 5-8. It should be noted, however, the seals 74 may be used in other orientations, e.g. horizontal or inclined orientations, when employed in other devices and/or other operations.

In the illustrated example, the group of seals 74 is exposed to a process fluid 82 on one side and to a barrier fluid or fluids 84 on the other side. By way of example, the barrier fluid(s) may be delivered to appropriate positions along or between the seals 74 via corresponding barrier fluid passage(s) 86 extending through the corresponding swivel ring 52 as illustrated. Additionally, an activation fluid 88 may be delivered through at least one activation fluid passage 90 also extending through the corresponding swivel ring 52 so as to activate the seals 74, thus ensuring adequate sealing between seal surfaces 76, 78. For example, the activation fluid 88 may be supplied under sufficient pressure to bias the bases of the seals 74 against seal surface 78 of swivel base 50 with desired force. The pressure applied to the activation fluid 88 may be greater than the pressures of the process fluid 82 and barrier fluid 86, in some applications, to ensure maintenance of the desired seal.

Figure 4:
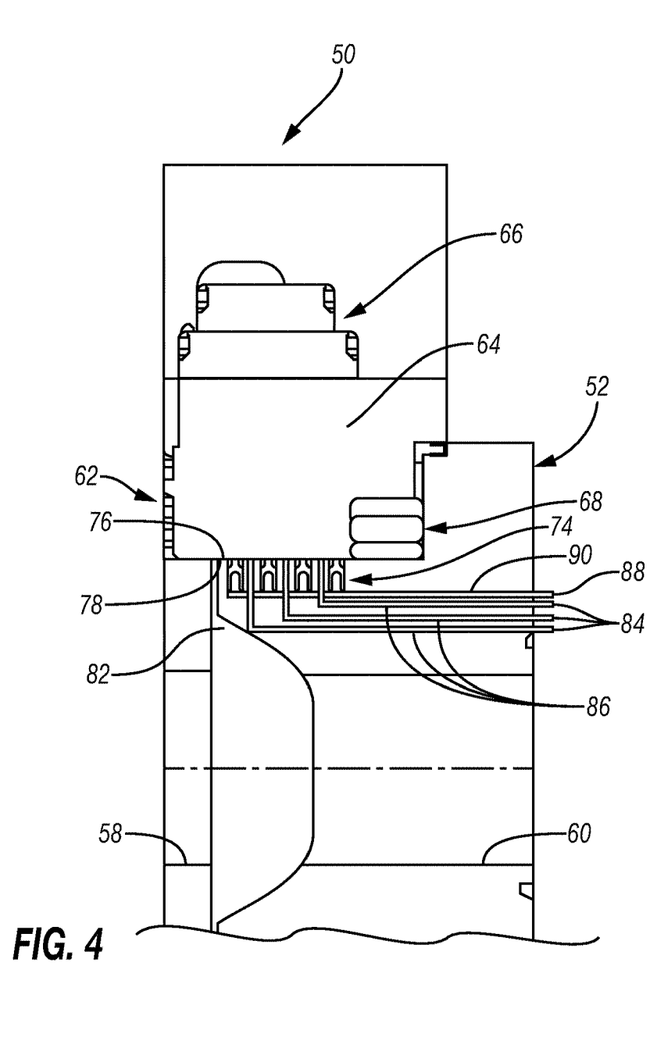
FIG. 4 is a cross-sectional illustration of a portion of FIG. 3 but with a radially shortened ring afforded by the corresponding radially shortened portion of the swivel base which enables both a decrease in swivel diameter and a reduction in hydraulic loading, according to an embodiment of the disclosure.

By constructing and orienting the seals 74 as described herein, the seals 74 may be spaced along a shorter radial extent of seal ring 52 and corresponding bearing ring 64. This enables a reduction in radial extent of the bearing rings 64 and the seal ring 52 by an amount represented by arrow 92. Consequently, the size, e.g. diameter, of the swivel 22 may be reduced while accommodating at least as much flow and at least as great a pressure rating. FIG. 4 illustrates a radially shortened seal ring 52 enabled by the overall radial reduction represented by arrow 92. The radial reduction also effectively reduces the size of the pressurized seal area 94 and thus a cross-sectional size of the swivel 22. This reduction in size of the pressurized area 94 operates to reduce the vertical load/stress acting on swivel 22, e.g. acting on swivel core 54 and nut 72.

Figure 5:
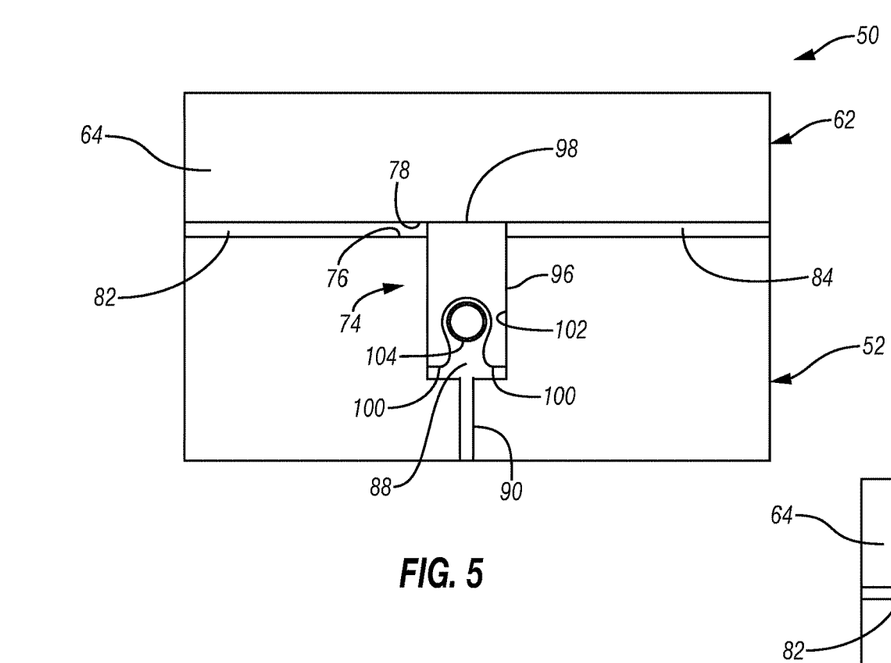
FIG. 5 is a cross-sectional illustration of an example of a seal positioned between corresponding seal surfaces, according to an embodiment of the disclosure.

Referring generally to FIG. 5, an example of an individual seal 74 is illustrated. In this embodiment, each seal 74 comprises a seal body 96 having a seal base 98 and a lip or lips 100 extending from the base 98. As illustrated, the seal base 98 is positioned against one of the seal surfaces 76, 78. In the specific example illustrated, the seal base 98 is positioned against the corresponding seal surface 78 of swivel base 50, e.g. against the bottom surface of the corresponding bearing ring 64 of swivel base 50.

The lips 100, e.g. a pair of lips, extend away from seal base 98 and away from the corresponding seal surface 78. Thus, in a vertical swivel application, the lips 100 extend in a vertical direction (downwardly or upwardly) relative to seal base 98. In other words, the seal base 98 and the lips 100 are oriented along a generally vertical axis and the seal base 98 is biased against a generally horizontal corresponding seal surface 78 to separate process fluid 82 from barrier fluid 84. However, the seals 74 may be oriented horizontally or in other desirable orientations depending on the parameters of a given overall system or application.

According to an embodiment, the seal base 98 is biased against corresponding seal surface 78 by activation fluid 88. In the illustrated example, the activation fluid 88 is delivered through seal ring 52 via passage 90 and into a region between lips 100. The activation fluid is thus able to bias seal base 98 against corresponding surface 78 and lips 100 in an outward direction.

By way of example, the seal 74 may be positioned in a recess 102 such that lips 100 extend into the recess 102 toward a base or bottom of the recess 102. The recess 102 may be formed in seal ring 52, e.g. in seal surface 76, and the lips 100 may be biased, via activation fluid 88, in an outward direction against the sidewalls forming recess 102. The activation fluid 88 may be delivered into recess 102 via activation fluid passage 90. In some applications, however, the seal 74 can be reversed and placed in a recess formed in bearing ring 64 or other structure adjacent seal ring 52. In some embodiments, each seal 74 further comprises a biasing member 104, e.g. a spring member, positioned between the lips 100 to further bias the lips 100 in the outward direction. Consequently, the seal base 98 is biased into sealing engagement with the corresponding surface 78 and the lips 100 are biased into sealing engagement with the sidewalls forming recess 102.

By activating the seal 74, at least three effective seal areas can thus be created. For example, two static seal areas and one dynamic seal area may be created. In the illustrated example, one static seal area is created between one of the lips 100 and the corresponding wall surface of recess 102 on the side of process fluid 82. Another static seal area is created between the other of the lips 100 and the corresponding wall surface of recess 102 on the side of barrier fluid 84. Additionally, a dynamic seal area is created between seal base 98 and corresponding seal surface 78 between the process fluid 82 and the barrier fluid 84.

When the seal 74 is activated via activation fluid 88 at a higher pressure than the process fluid pressure, a differential pressure is achieved which enables seal 74 to tightly seal against surface 78. This dynamic seal remains tight even if the barrier fluid 84 is lost. Additionally, the applied activation pressure of activation fluid 88 may be adjusted to keep operational friction forces at a desired level, e.g. at a minimum level which still maintains a suitable seal.

Figure 6:
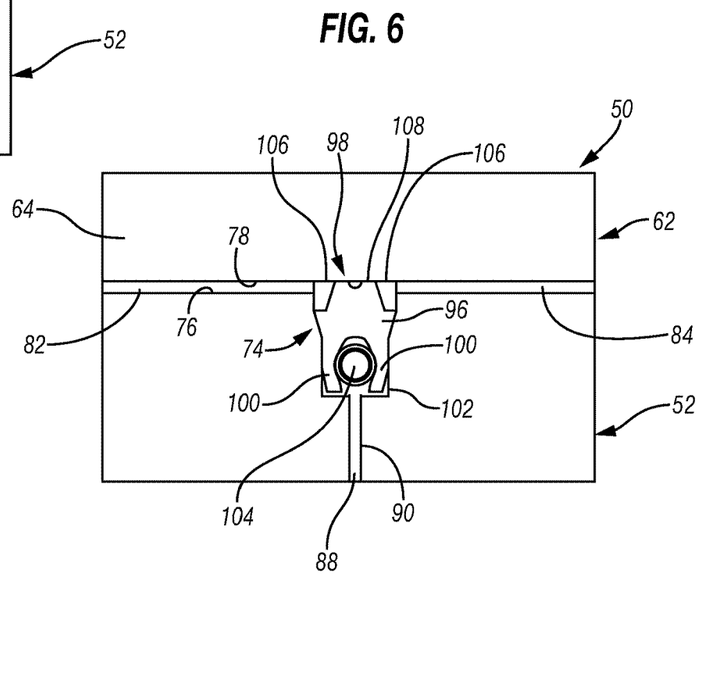
FIG. 6 is a cross-sectional illustration of another example of a seal positioned between corresponding seal surfaces, according to an embodiment of the disclosure.

Referring generally to FIG. 6, another embodiment of seal 74 is illustrated. In this example, the seal base 98 combines a pair of backup rings 106 disposed on radial sides of a center seal section 108. The use of backup rings 106 helps prevent extrusion of the center seal section 108 and thus allows the use of seal 74 in higher pressure applications. In this embodiment, the biasing member 104 comprises a spring member positioned to bias a pair of lips 100 outwardly in radial directions.

Figure 7:
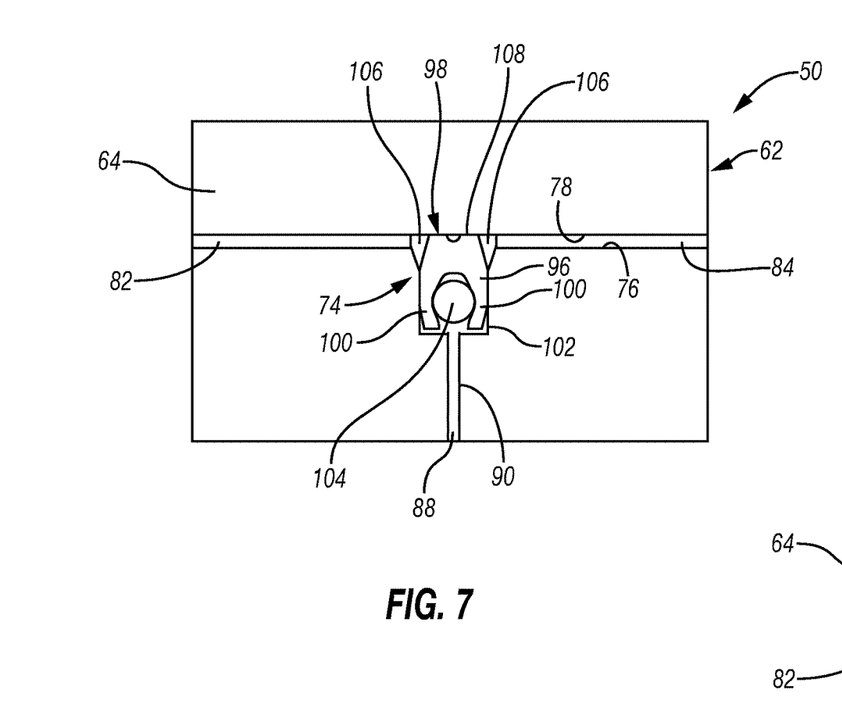
FIG. 7 is a cross-sectional illustration of another example of a seal positioned between corresponding seal surfaces, according to an embodiment of the disclosure.

Another embodiment is illustrated in FIG. 7 and this embodiment is similar to the example of FIG. 6 but utilizes a different style of backup rings 106 and a differently shaped recess 102. Depending on the parameters of a given operation, different styles and sizes of backup rings 106 may be used to form the dynamic seal between surfaces 76 and 78.

Figure 8:
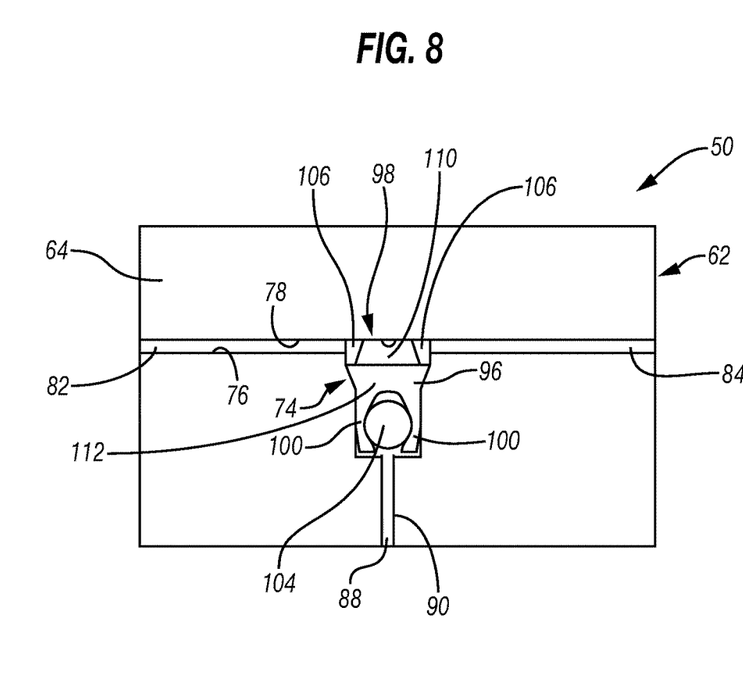
FIG. 8 is a cross-sectional illustration of another example of a seal positioned between corresponding seal surfaces, according to an embodiment of the disclosure.

Referring generally to FIG. 8, another embodiment of seal 74 is illustrated. In this example, the seal body 96 is constructed from a plurality of materials. For example, the portion of seal body 96 comprising seal base 98 is formed from one type of seal material 110 which is bounded by backup rings 106. The remainder of the seal body 96, including lips 100, is formed from a second material 112. The seal material 110 may be selected according to desired dynamic sealing properties for a given operation and environment. The second material 112 may be selected according to various considerations related to, for example, longevity, cost, or other factors affecting the operation.

The specific material combinations may be selected to enhance a variety of desired functions in many types of environments. Factors which affect selection of materials may include wear resistance, chemical resistance, seal tightness, high pressure applications, low pressure applications. Thus, the seal body 96 and/or other components of seal 74 may be constructed with various composite materials or combinations of materials to achieve the desired seal characteristics for a given operation.

The construction of seals 74 as face seals (with seal base 98 biased against a seal surface while lips 100 extend away from the seal surface) provides a compact seal with great sealing capability. If multiple seals 74 are positioned along a seal surface, the overall pressurized area 94 can be substantially reduced relative to the pressurized area that would be associated with conventional seals.

In swivel applications, the vertical orientation of the activated seals 74 enables shorter radial lengths along which the seals 74 are positioned and thus a smaller pressurized area 94. In some embodiments, the size of the pressurized area 94 may be reduced by 20-40% or more. This, in turn, substantially reduces the loading on components of the swivel 22, e.g. loading on the swivel core 54 and swivel nut 72. The construction of each seal 74 further provides a unique combination of static and dynamic functions in a single seal unit, e.g. a single seal with two static seal areas and a dynamic seal area. The use of seals 74 in swivel applications enables construction of smaller swivels 22 and/or the use of higher pressures without exceeding loading limitations of the swivel materials. In some applications, the sealing capability can be controlled by applying greater pressure to the activation fluid 88.

Depending on the specifics of a given use, the number of seals 74, the orientation of seals 74, and the materials selected in construction of seals 74 may vary to accommodate the parameters of a given operation, equipment, and/or environment. Furthermore, various embodiments of the activated face seals 74 may be used in many types of systems and operations. Each seal 74 may be energized by various types of biasing members 104 and activation fluids 88.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for coupling operational lines employed in a subsea application, comprising:
a swivel having a geostationary portion and a plurality of rings rotatably mounted about the geostationary portion, each ring comprising a pair of ring seal surfaces which are movable relative to a pair of corresponding seal surfaces of the geostationary portion, the swivel further comprising a plurality of seals disposed along each ring seal surface, each seal comprising:
a body having a base and lips extending from the base, the base being positioned against one of the corresponding seal surfaces and the lips extending away from the corresponding seal surface, the body being exposed to a process fluid on one side and to an activation fluid on an adjacent side, wherein the activation fluid is delivered through an activation fluid passage and pressurized to bias a biasing member positioned between the lips and to bias the base against the corresponding seal surface.

2. The system as recited in claim 1, wherein the body separates the process fluid from a barrier fluid and/or environment.

3. The system as recited in claim 1, wherein each seal is arranged vertically such that the lips extend in a generally vertical direction from the base.

4. The system as recited in claim 1, wherein the biasing member comprises a spring member.

5. The system as recited in claim 1, wherein the body is constructed from a plurality of different materials.

6. The system as recited in claim 5, wherein the base comprises a seal material bounded by a pair of backup rings.

7. The system as recited in claim 1, wherein the ring seal surfaces of the pair of ring seal surfaces are generally parallel to each other and lie along radial planes.

8. The system as recited in claim 1, wherein at least one ring of the plurality of rings comprises a fluid flow passage extending radially therethrough.

9. A system, comprising:
a swivel base;
a ring rotatably mounted on the swivel base, the ring having a recess in communication with an activation fluid passage; and
a seal comprising a body having a seal base and lips extending from the seal base, the seal being disposed between a ring seal surface of the ring and a base seal surface of the swivel base, the seal being captured in the recess of the ring such that the seal base is adjacent the base seal surface and the lips extend into the recess;
wherein an activation fluid is delivered through the activation fluid passage and pressurized to bias a biasing member positioned between the lips and to bias the seal base against the corresponding base seal surface of the swivel base.

10. The system as recited in claim 9, wherein the swivel base is a vertically oriented geostationary portion.

11. The system as recited in claim 10, wherein the ring comprises a plurality of rings mounted generally horizontally around the vertically oriented geostationary portion.

12. The system as recited in claim 11, wherein each ring comprises a pair of the ring seal surfaces oriented generally parallel with each other.

13. The system as recited in claim 12, wherein the seal comprises a plurality of seals disposed along each ring seal surface of the pair of ring seal surfaces.

14. The system as recited in claim 13, wherein the lips of each seal are energized by a spring member.

15. The system as recited in claim 13, wherein the lips of each seal are energized by the activation fluid delivered through the activation fluid passage.

16. A method, comprising:
providing a swivel with a vertical swivel base and a plurality of rings rotatably mounted about the swivel base;
coupling fluid flow lines to the swivel base and to the plurality of rings to enable flow of process fluids through the swivel;
positioning a plurality of vertical, activated face seals between horizontal seal surfaces of each ring and corresponding surfaces of the vertical swivel base to prevent escape of process fluids; and
activating the plurality of vertical, activated face seals via an activation fluid supplied through each ring;

wherein the activation fluid is pressurized at a pressure greater than the pressure of the process fluids and bias the vertical, activated face seals against the corresponding surfaces of the vertical swivel base.

17. The method as recited in claim 16, wherein providing the swivel comprises mounting the swivel on a surface vessel located at a surface of the sea.

18. The method as recited in claim 16, wherein positioning comprises positioning a plurality of the vertical, activated face seals in corresponding recesses located along each horizontal seal surface.

19. The method as recited in claim 16, further comprising providing each vertical, activated face seal with a body having a seal base and lips extending from the seal base along a generally vertical direction.

* * * * *